US007195219B2

(12) United States Patent
Irwin et al.

(10) Patent No.: US 7,195,219 B2
(45) Date of Patent: Mar. 27, 2007

(54) MODULAR DENTAL CHAIR EQUIPMENT MOUNTING SYSTEM

(75) Inventors: Shawn R. Irwin, Newberg, OR (US); Jonathan E. Myers, Portland, OR (US); Paul H. Johnson, Jr., Tigard, OR (US); J. Rick Halbirt, Hubbard, OR (US); Robin R. Winter, Newberg, OR (US)

(73) Assignee: A-dec, Inc., Newberg, OR (US)

( * ) Notice: Subject to any disclaimer, the term of this patent is extended or adjusted under 35 U.S.C. 154(b) by 0 days.

(21) Appl. No.: 10/734,068

(22) Filed: Dec. 10, 2003

(65) Prior Publication Data

US 2005/0127724 A1 Jun. 16, 2005

(51) Int. Cl.
*F16M 13/00* (2006.01)
*A61G 15/00* (2006.01)

(52) U.S. Cl. .............................. 248/284.1; 248/282.1; 433/33; 433/79; 297/242

(58) Field of Classification Search ............ 248/284.1, 248/274.1, 276.1, 278.1, 282.1, 281.11; 433/79, 433/28

See application file for complete search history.

(56) References Cited

U.S. PATENT DOCUMENTS 336,220 A * 2/1886 Farrar ........................ 297/242
1,733,107 A * 10/1929 Ahlberg ...................... 108/137
3,243,497 A * 3/1966 William et al. ............... 174/61
3,311,411 A * 3/1967 Page et al. .................. 297/170
3,550,892 A * 12/1970 Propst ..................... 248/282.1
3,755,899 A * 9/1973 Betush ........................ 433/28
3,771,226 A * 11/1973 Lieb et al. .................... 433/33
3,986,263 A 10/1976 Borgelt et al.
4,026,026 A * 5/1977 Richardson .................. 433/79
4,249,900 A 2/1981 Hoelzer et al.
4,311,461 A 1/1982 Hotta et al.
4,427,382 A 1/1984 Hoffmeister et al.
4,500,134 A * 2/1985 Kaneko et al. ............. 297/170
4,564,179 A * 1/1986 Hollingsworth .............. 269/71
4,610,630 A * 9/1986 Betush ........................ 433/79
4,695,024 A * 9/1987 Haven .................. 248/281.11
5,017,139 A 5/1991 Mushabac
5,158,453 A 10/1992 Brockway
5,295,825 A * 3/1994 Betush ........................ 433/28
5,348,472 A 9/1994 Joecket et al.

(Continued)

FOREIGN PATENT DOCUMENTS

DE 29515339 U1 1/1997

OTHER PUBLICATIONS

A dec, Inc., Discover Radius Flexibility, 11 pages (1998).

(Continued)

*Primary Examiner*—Anita M. King
(74) *Attorney, Agent, or Firm*—Klarquist Sparkman, LLP

(57) ABSTRACT

A system for reconfigurably adapting a dental chair for use, including, e.g., use from the right side or left side, use by right-handed or left-handed practitioners and use in various dentistry practice styles, may include a link arm, a primary arm and a secondary arm. The link arm is pivotably connectible to a rear side of the dental chair. The primary arm is pivotably connectible to the link arm to swing in a generally horizontal plane about a generally vertical axis. The secondary arm is coupleable to the link arm, preferably along substantially the same axis. The secondary arm has multiple pivotably connected segments allowing its distal end to be positioned as desired.

10 Claims, 8 Drawing Sheets

U.S. PATENT DOCUMENTS

| | | | | |
|---|---|---|---|---|
| 5,542,138 | A * | 8/1996 | Williams et al. | 5/658 |
| 5,601,331 | A | 2/1997 | Austin, Jr. et al. | |
| 6,179,262 | B1 * | 1/2001 | Ellard et al. | 248/276.1 |
| 6,481,688 | B1 * | 11/2002 | Welling et al. | 248/694 |
| 6,514,239 | B1 * | 2/2003 | Shimmura et al. | 606/1 |
| 6,834,837 | B1 * | 12/2004 | Schilt et al. | 248/284.1 |
| 2001/0027313 | A1 | 10/2001 | Shimmura et al. | |
| 2004/0094676 | A1 * | 5/2004 | Cuomo | 248/125.7 |

OTHER PUBLICATIONS

Forest, Forest Over-the-Patient IC Delivery Systems, Model 4460, 1 page (1994).
Holland Dental, Model No. Luna 1, 1 page (1991).
MDT, The AsepTec™ 3000 Delivery System. Dedicated to Patient Care., Model AsepTec 3000, 1 page (1995).
Finndent, Model Quint 7000, 1 page (1994).
Heka Dental, Model No. UNIC LINC PC.
AMPCO, Trimline Series Units, Models 4115 and 4110, 1 page (1991).
BESMED, Model BM DUO 100, 1 page (2001).
Biotec, Model CM-3A-C-V, 1 page.
CEDIME, Model Boston, 1 page.
Chayes Virginia, Model TC-50-3, 1 page (1976).
Chirana, Model Premadent S1, 1 page.
Craftmaster Contour Equipment, Inc., Model The Deanna, 1 page.
D&A Clinic, Model HECIX, 1 page.
Dansereau Health Products, 1 page (1993).
Densco, Model Concept, 1 page (1972).
Dental Unit Delivery Systems, Model S-T 3690, 1 page (1983).
DS Dental, Model Epilux, 1 page (1992).
Euro Cad, 1 page (2000).
Euro Cad, Model Euro Star, 1 page (2000).
FAMED, 1 page (2001).
Famed Zywier, Model Feniks 2000, 1 page (2001).
Forest, Basic Delivery Systems, Model 4180, 1 page (1996).
Gnatus, Model Practico, 1 page (1996).
Gnatus, Model Doctor, 1 page (1996).
Hallim, Model Eclipse, 1 page (2001).
Health-Kit Corporation, 1 page (1977).
Healthco International Inc., Model Celebrity Elite, 1 page (1988).
Icast, Model S.E.M., 1 page (1993).
Ingeni, Model 800e, 1 page (2001).
Interdent Corp., Model Fanline System, 1 page.
J. Morita Corp., Model Space Line 630, 1 page (1992).
Kavo, Model Estetica 1065, 1 page (1997).
Kavo, Model Systematica 1060T, 1 page (1989).
Litton Dental Products, Model LS:3000, 1 page (1975).
LSM, Model ASFPSIS Series, 1 page (2000).
Marco, Model 6400, 1 page (1980).
Medimess, Model 2000 Chair, 1 page (1992).
Mikrona Technologie AG, Model Orthora, 1 page (1995).
Nipo Mex, Model T.R.K., 1 page.
PRI, Model P-1000, 1 page (1996).
Quentin, Model Drive, 1 page (1997).
Rigel, Model New Line 2002, 1 page.
Robin Dental, Model DL-1, 1 page (1993/1994).
Ros, Model Colibri Top, 1 page.
Ros, Model NEOS, 1 page.
Sankin, Model Airform, 1 page.
The Schein Dental Equipment Corp., Model Crusader, 1 page.
SDS, Model 2000-XL, 1 page (1994).
Shinhung, Model Taurus, 1 page (1996).
Seimens, Model Sirona M1, 1 page.
Technodent, Model Linda, 1 page (1995).
TGA, Model K2, 1 page (1999).
Trophy, Model Compact, 1 page.
Vacudent, Model Premier Edition IL-1800, 1 page (1992).
Webber, Model Access 4, 1 page (1970s).
Westar Medical Products, Inc., Model Westar 2010, 1 page (1998).
Xo-Care, Model Xo-Flex, 1 page (2002).
Yoshida, Model Pure, 1 page (2001).
DCI, Model 6547 Assistants Cart, 1 page (1999).
Hamapro, Model Luna II, 1 page (1993).
Dinfonest, Model EOM-E SC, 1 page.
Pacific Airel, Model Pacific Chir, 1 page (Dec. 2000).
Dentech, Model CM27005 w/AST 101, 1 page (1998).
Engle Dental Systems, Model The Vizcaya, 1 page.
Midmark, Model Midmark LR, 1 page (2000).
OMS Staff, Model Arco, 1 page (2001).
Pelton & Crane, Model Spirit 2000, 1 page (2000).
Pelton & Crane, Model Symphony, 1 page (1995).
Pelton & Crane, Model Spirit AC, 2 pages (1995).
Planmeca Group, Model PM 2002 CC, 1 page (1994).
Proma, Model Signet, 1 page.
Proma, Model Compass Series, 1 page (1994).
Minerva, Model Crusader, 1 page.
Trident, Model Prima, 1 page (2000).
Ancar, Model SD 250, 1 page.
Neodent, Models Triton E and Triton L, 1 page.
Anatom, Model VAC-600-2, 1 page (1992).
Cacan, 1 page (1992).
Chiradent, 1 page (1999).
Chirana-Medical, Models Avantgarde, Min and Sympatic, 2 pages (2001).
Fimet Oy, Model F1, 1 page.
Flex Equipment, 1 page.
Kodel, Model Choice, 1 page.
MCC, Models MCC 4900, MCC 4800 and MCC 4700, 1 page.
Olsen, Model Turim, 1 page.
PT Andini Sarana, 1 page.
Royal, Models 1, 16, 16P, GP2, OR2, OR2M and PD2, 1 page.
SDI, 1 page (1979).
Odontotechica Selecto, Various Models, 1 page.
Westar, 1 page (1998).
Dinfonest, Models Sigma SS and Sigma SC, 3 pages (2002).
A-dec, Models Excellence 4300, Cascade 1040 and Decade 1021, 4 pages (1986).
European Search Report (EPC No. 04106297.7) dated Jun. 13, 2005.

* cited by examiner

FIG. 8
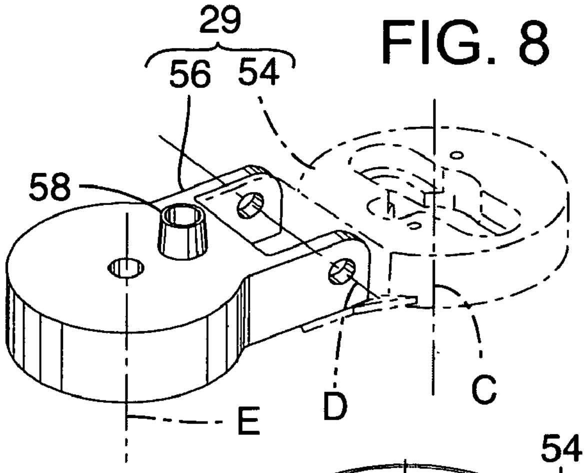
FIG. 6
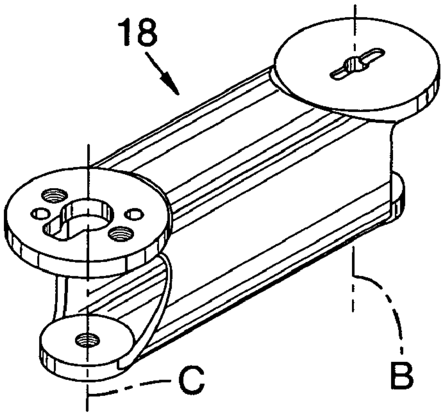
FIG. 7
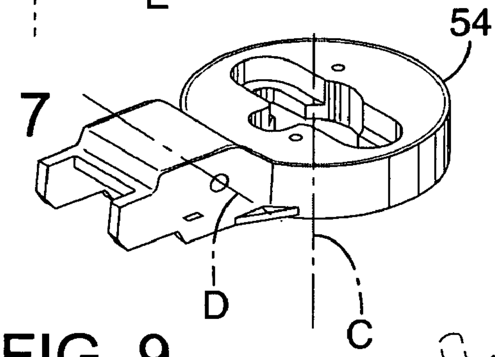
FIG. 9
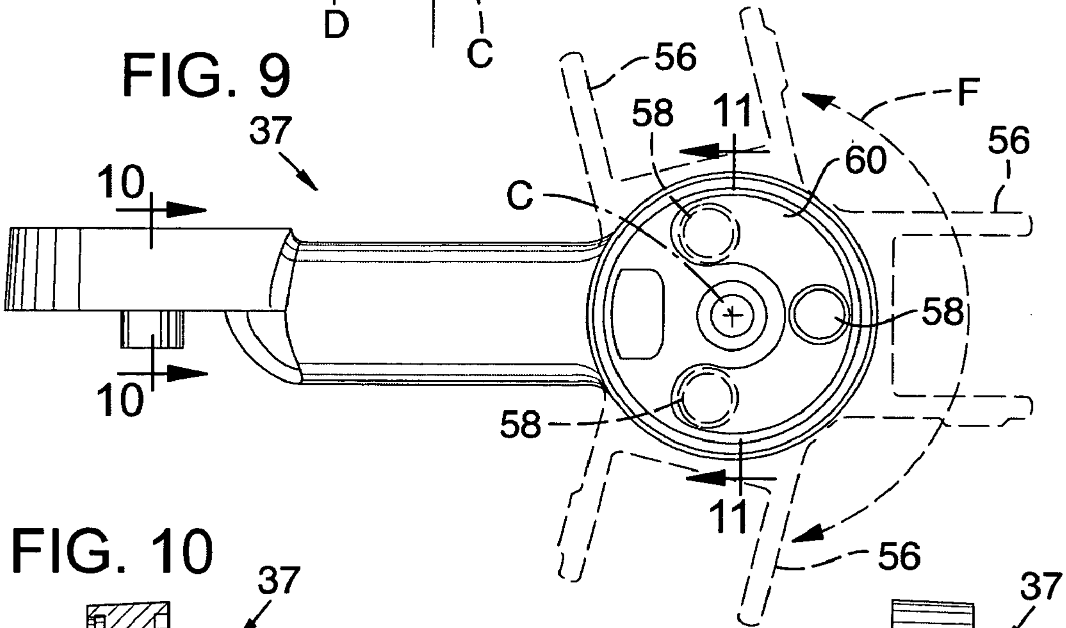
FIG. 10
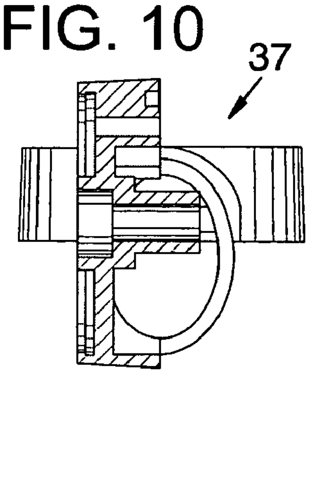
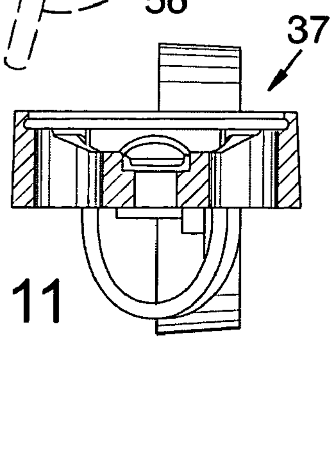
FIG. 11

2-HANDED
INDIRECT LONG ARM

2-HANDED
INDIRECT SHORT ARM

4-HANDED
INDIRECT LONG ARM

4-HANDED
INDIRECT SHORT ARM

2-HANDED
DIRECT LONG ARM

2-HANDED
DIRECT SHORT ARM

MODULAR DENTAL CHAIR EQUIPMENT MOUNTING SYSTEM

BACKGROUND

Chair systems for the practice of dentistry and other similar procedures are known. A chair system typically includes a chair that is adjustable in height and is shaped to support the patient's body, generally from the head to the lower legs. The chair can usually be reclined to position the patient, and particularly the patient's mouth, for convenience to the dentist and other attending personnel.

According to one style of dental chair systems, various equipment used in dental procedures is positioned within reach of the attending personnel by movable support arms that are connected to the dental chair, usually near its base. Such equipment traditionally included tools and fluid systems for providing water, compressed air and vacuum. In the past, such support arms have been connected at various points, including either side of the chair, the front of the chair or the rear of the chair. In another style of chair system, such equipment arms are attached to nearby walls and are not attached to the chair itself.

Conventionally, both "two-handed" and "four-handed" dentistry styles are practiced. Two-handed dentistry refers to practices involving a single practitioner (e.g., dentist, assistant or hygienist), whereas four-handed dentistry refers to practices in which two individuals work together. In the past, available dental chair systems have been optimized for either two-handed or four-handed dentistry, and could not easily be adapted to switch between the two modes conveniently, as may be required in a busy practice. Exemplary styles of two-handed and four-handed dentistry are depicted in the schematics of FIGS. 14A–14F.

In addition, most prior dental chair systems were optimized for either a right-handed practitioner or a left-handed practitioner and could not be easily switched between the two configurations. Thus, in modem practices where multiple dentists might each oversee a number of patients, scheduling each patient according to the dedicated equipment required by the supervising dentist can be quite cumbersome.

Also, in typical modem dentistry practice, much more equipment is made available to the dentist and to the patient than in the past. Such equipment may include information displays (such as one or more computer monitors), controls, lights, cuspidors, amalgam collection units, as well as traditional dentistry tools such as drills and compressed air, water and vacuum tools. Thus, providing such equipment in a safe and flexible handling arrangement that allows for its use in various modes presents additional challenges.

SUMMARY

Described below are various representative embodiments of a modular equipment mounting system for a dental chair. The system has one or more support arms that allow users to easily reconfigure how dental equipment is supported and positioned to accommodate different practice styles and needs.

According to one aspect, a dental chair system includes a base with a height-adjustable support to which a portion of a dental chair may be coupled, a link arm, a primary support arm and a secondary support arm. The support has a rear side (at the "head" end of the chair) and a longitudinal axis, which is defined to be substantially parallel to the chair's axis. The link arm has distal and proximal ends, with the proximal end being pivotably connected to the support adjacent the rear side such that the link arm is pivotable to opposite sides of the longitudinal axis about a substantially vertical pivot axis. The primary support arm is pivotably connected to the distal end of the link arm for rotation relative to the link arm about a substantially vertical pivot axis. The secondary support arm is connected to the distal end of the link arm substantially along the vertical pivot axis. The primary and secondary support arms are adapted to support weight, e.g., equipment, and to be moved relative to each other and to the link arm.

The secondary support arm can have an anti-interference feature to allow movement of the secondary support arm relative to the primary support arm to prevent interference between the support arms when the primary support arm is pivoted. The secondary support arm can have an auxiliary pivot connection with a substantially horizontal pivot axis about which the second support arm can be vertically pivoted.

The secondary support arm may be adapted to support operator equipment, including conduits, which as used herein include fluid conduits (such as hoses, tubing and/or other structures for handling fluids) for water, compressed air, vacuum, etc., and/or electrical conduits (such as cables, wires or other electrical conductor via which power is supplied or electrical signals are communicated).

A manifold can be coupled to the link arm, e.g., adjacent its distal end. The manifold may be mounted to the link arm substantially along the vertical pivot axis. In other embodiments, the manifold is mounted at other suitable locations.

The dental chair system can include a pivot bracket shaped to receive and pivotably support the proximal end of the link arm. The bracket can be mounted to the rear side of the support. In preferred embodiments, the bracket is mounted in alignment with the longitudinal axis. The link arm may be swingable through an arc of at least 180°, allowing the link arm to be angled relative to the longitudinal axis on either side by at least about 90°. In other embodiments, the range of rotation may be less, e.g., an arc of about 140°.

The primary support arm may have an upwardly extending mast, which can be positioned, e.g., adjacent its distal end. The mast may be used to support operator equipment. Such operator equipment may be pivotably mounted on the mast and selectively rotatable relative to the mast (e.g., for re-orientation of the equipment after the primary support arm is swung to an opposite side of the longitudinal axis). One such type of equipment that can be rotatably mounted to the mast is a cabinet. Other equipment, such as a cuspidor, can be rotatably mounted to the cabinet, which can provide an increased degree of freedom of movement for increased flexibility and convenience.

The connection between the secondary arm and the link arm may be a fixed connection, a pivotable connection, or other suitable type of connection. The secondary support arm may be attached to an upper surface of the link arm and cantilevered above a plane of the primary support arm and the link arm.

The secondary support arm may be pivotable in a horizontal plane above the link arm and the primary support arm. The secondary support arm may include at least a first segment having the auxiliary pivot connection and at least a second segment pivotably connected to the first segment for rotation in a generally horizontal plane. The secondary support arm may also include at least a third segment pivotably connected to the second segment for rotation in a generally vertical plane.

The dental chair system may include a chair coupled to the support, and the pivot axis for the link arm may intersect a back portion of the chair when the chair is in the reclined position.

At least one of the link arm, the primary arm and the secondary arm may have a substantially hollow construction or interior open areas through which conduits can be routed.

According to another aspect, a dental chair system includes a base with a height-adjustable support to which a dental chair may be coupled, an equipment arm pivotably coupled to the support and an auxiliary pivot connection. The equipment support arm comprises multiple segments joined to each other at pivotable connections. The auxiliary pivot connection has a substantially horizontal pivot axis. The auxiliary pivot connection joins two of the segments, including, relative to the support, a proximal segment and a distal segment. The auxiliary pivot connection prevents the distal portion from rotating in a vertical plane below horizontal and allows rotation above horizontal, e.g., the support arm contacts an object upon lowering of the base.

The manifold may be positioned between the auxiliary pivot connection and the base. The support arm may include an elongate, generally lateral portion, extending between the seat base and an inner side of the auxiliary pivot connection. The support arm may have a second substantially vertical pivot axis positioned outward of the auxiliary pivot connection.

According to another aspect, an arm assembly to adapt a dental chair for right-side or left-side use includes a compensating arm segment pivotably connected to the rear side of the dental chair, a primary arm pivotably connected to the compensating arm at a primary pivot axis and a secondary arm connected to the compensating arm. The primary arm is positioned to pivot in a generally horizontal plane. The secondary arm has multiple segments and is vertically and horizontally movable relative to the compensating arm and the primary arm. The length of the compensating arm can be set to position the primary pivot axis at a sufficient distance from the support to permit movement of the primary and secondary arms without interference.

According to another aspect, an arm assembly for a dental chair includes a single pivot connection positioned adjacent the head-end and below the patient supporting portion of the dental chair with a pivotably supported link arm, and at least two equipment arms connected to the link arm at points substantially aligned in a vertical direction.

According to another aspect, an arm assembly for positioning equipment in a dental chair system includes a first element for pivotable attachment to a dental chair, a second element pivotably attached to an end of the first element at a substantially vertical first pivot axis, a third element attached to the first element substantially along the first pivot axis, and a fourth element attached to the third element at a substantially vertical second pivot axis that is horizontally spaced from the first pivot axis.

According to another aspect, an arm assembly for a dental chair includes a link arm for pivotable connection to the rear of the dental chair allowing rotation in a substantially horizontal plane and a support arm connected to the link arm. The support arm has multiple pivotably connected elongate segments capable of being positioned in space at a desired location and a structural element for preventing interference between the support arm and other structure adjacent the dental chair.

According to another aspect, a multi-segmented arm assembly for a dental chair includes a link arm segment for pivotable attachment to a rear of the dental chair, a first segment coupled to a distal end of the link arm segment, a second segment pivotably connected to a distal end of the first segment at a substantially vertical pivot axis, a third segment pivotably connected to a distal end of the second segment at a substantially horizontal pivot axis, and a terminal segment pivotably connected to a distal end of the third segment.

There can be an optional fourth segment pivotably connected to the third segment in place of the terminal segment, with the terminal segment pivotably connected to the fourth segment instead of the third segment. The terminal segment can be pivotably connected at a substantially horizontal pivot axis.

Segments of the secondary arm may have a parallelogram supporting structure that retains the segments in their respective positions. In some implementations, at least the third and/or fourth segments have such supporting structures.

The arm assembly may also include a multi-function electronic control unit coupled to one of the segments, the control unit having wiring extending through at least one of the segments. The electronic control unit can be coupled to the terminal segment. The electronic control unit can be rotatably coupled to the terminal segment. The arm assembly may include at least one tool holder rotatably mounted to the terminal segment.

In the arm assembly, at least one of the segments can be configured to have a predetermined normal range of rotation about its respective pivot axis and to permit over-rotation beyond the predetermined normal range without damage.

According to another aspect, a multi-segmented arm assembly for supporting equipment for use with patients is pivotably connected to a rear of the dental chair and includes at least five segments, each segment having at least one pivotable connection to at least one other segment, the segments and pivotable connections allowing the arm assembly to be raised, lowered and rotated to position a distal end of the arm end at desired positions relative to the rear of the dental chair.

The foregoing and other features and advantages will become more apparent from the following detailed description of several embodiments, which proceeds with reference to the accompanying figures.

BRIEF DESCRIPTION OF DRAWINGS

FIG. 6 is a perspective view of the link arm of FIG. 4.

FIG. 7 is a perspective view of a first part of the first segment of the secondary arm.

FIG. 8 is a perspective view of a second part of the first segment of the secondary arm, also showing in dashed lines the first part of FIG. 7 joined at the horizontal pivot axis D.

FIG. 9 is a top plan view of a second segment of the secondary arm showing various positions through which the second segment can be rotated.

FIG. 10 is a section view of the second segment of FIG. 9 taken at the lines 10—10.

FIG. 11 is a section view of the second segment of FIG. 9 taken at the lines 11—11.

DETAILED DESCRIPTION

Figure 1:
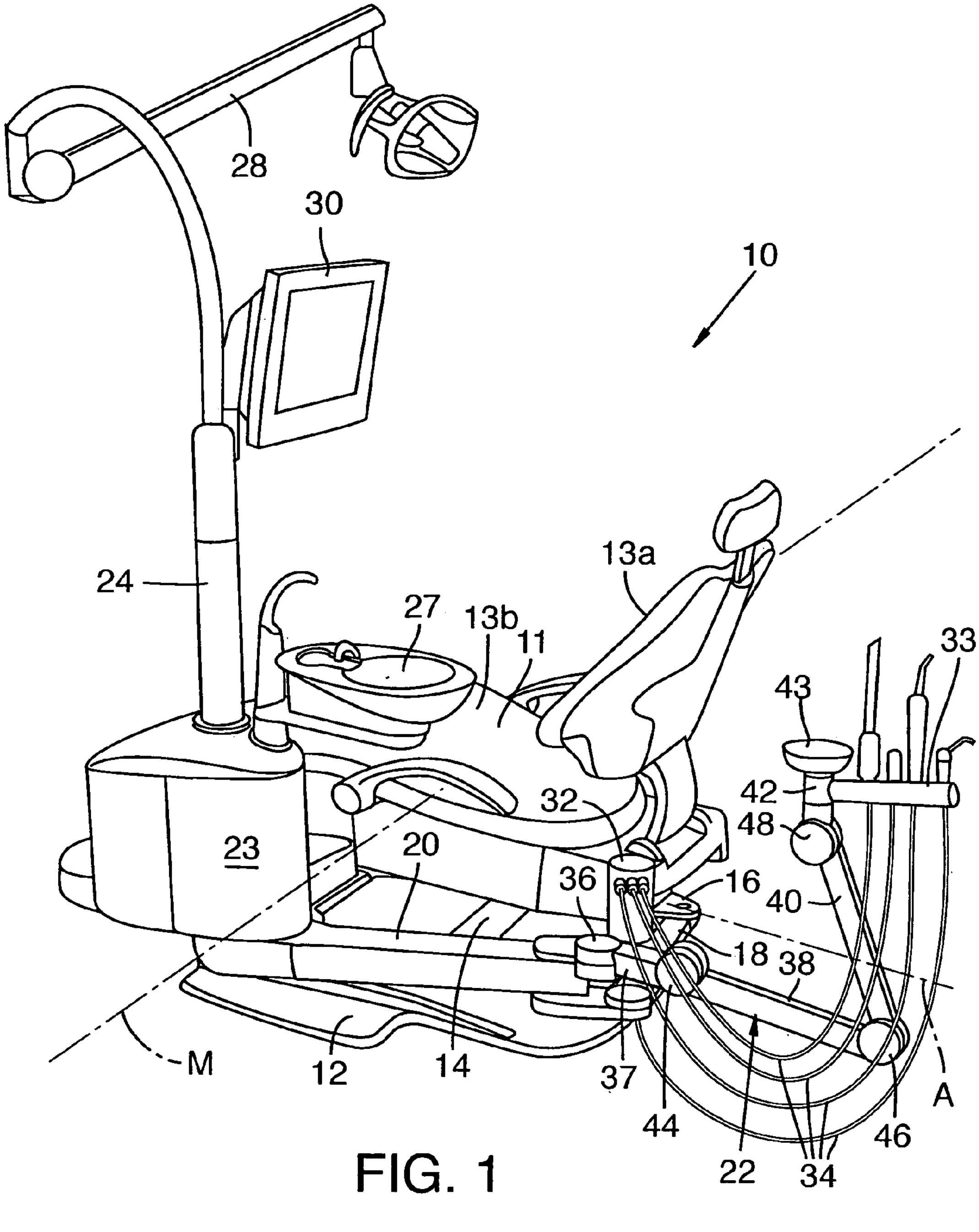
FIG. 1 is a left side perspective view of a representative dental chair system showing a height adjustable dental chair and an arm assembly pivotably attached to a rear side of the chair system, the arm assembly having a link arm and primary and secondary equipment support arms.
Figure 2:
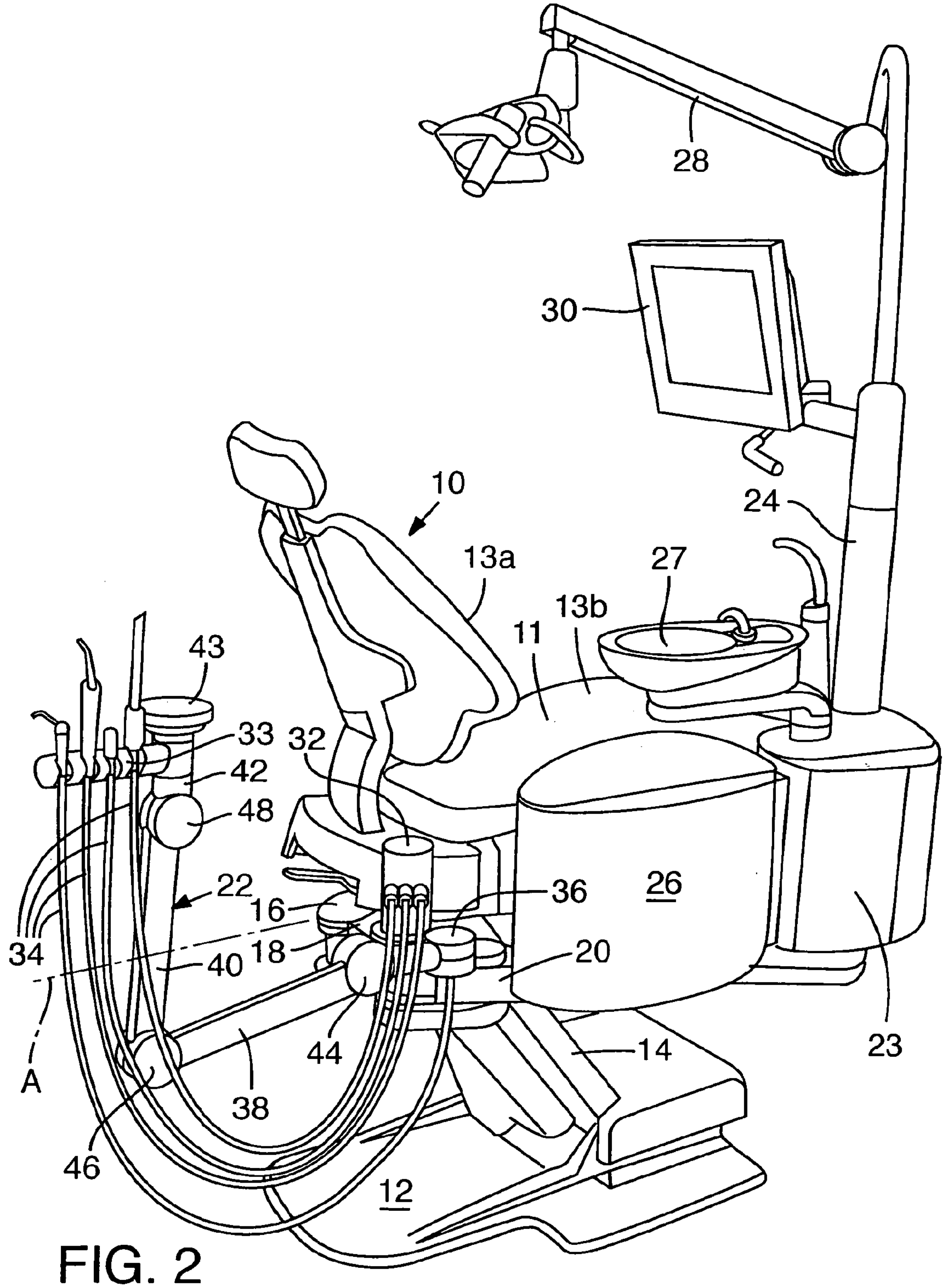
FIG. 2 is a right side perspective view of the dental chair system of FIG. 1, except that the link arm has been rotated in a generally horizontal plane from a left side of the dental chair to the right side, with the primary arm rotated to be along the right side of the chair and the secondary arm projecting rearwardly.

Referring to FIGS. 1 and 2, a representative embodiment of a dental chair system, referred to generally as 10, includes a dental chair 11 coupled to a base 12 by a support portion 14. In the illustrated embodiments, the support portion 14 is selectively movable to allow at least the raising and lowering of the chair 11 relative to the base 12 for facilitating access to a patient.

The chair 11 as shown in FIGS. 1 and 2 is in a semi-upright position, with a back section or portion 13*a* extending uprightly relative to a seat portion 13*b*. The back portion 13*a* can be reclined and more closely aligned with the seat portion 13*b* to position the patient in a prone position, as shown schematically in the plan views of FIGS. 14A–14F. As used herein, "rear" is defined to be proximal to the end of the chair 11 designed to support the patient's head and torso, i.e., the "head" end of the chair. Thus, the rear side of the base 12/support 14/chair 11 includes the areas rearward of a middle lateral axis M, including the rear surfaces of the base 12 and areas adjacent where the support portion 14 and chair 11 are connected. The chair 11 has a longitudinal axis A, a portion of which is shown in FIGS. 1 and 2 extending from the rear area.

Figure 3:
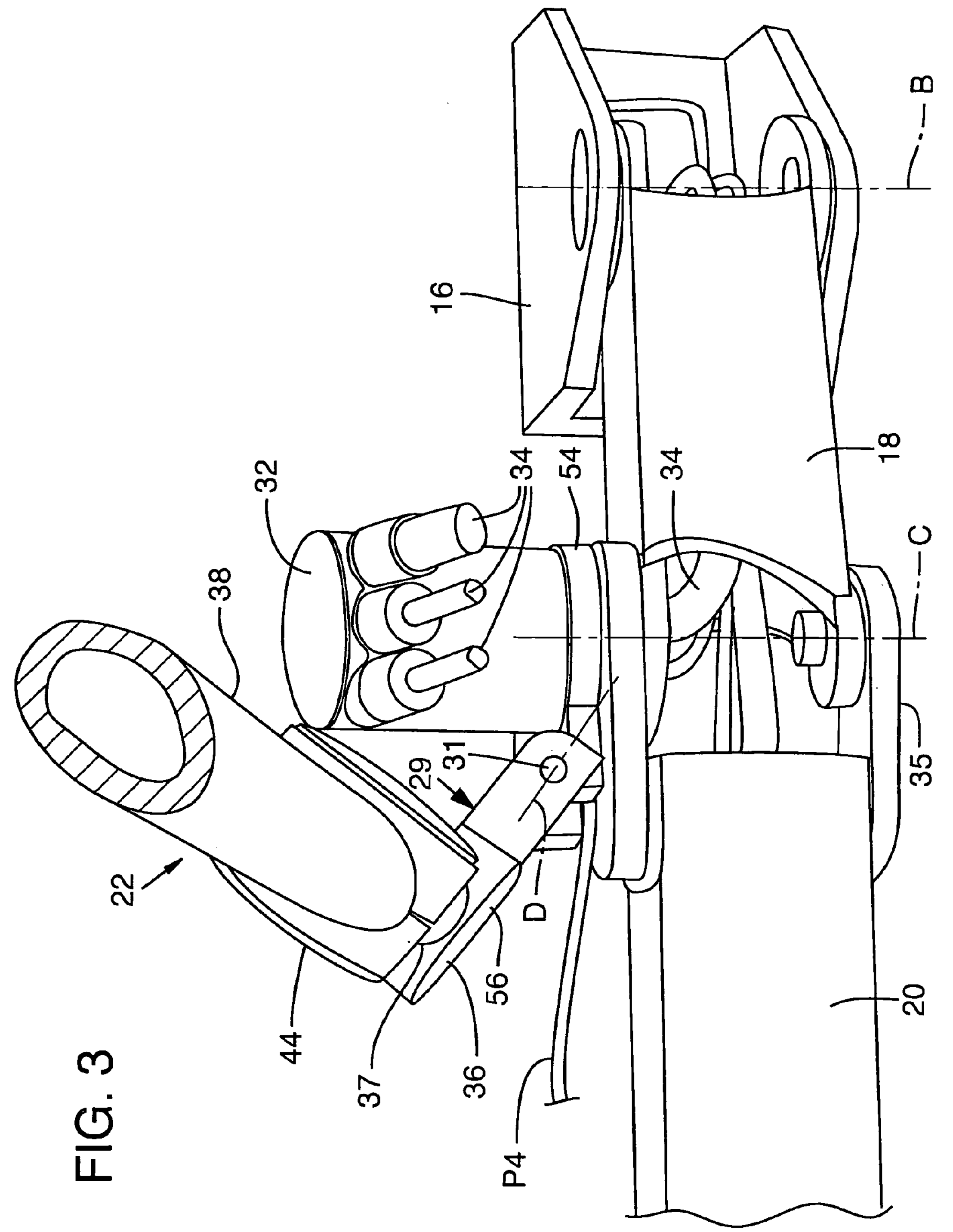
FIG. 3 is a magnified partial perspective view of a portion of the arm assembly showing a pivot bracket, the attached link arm, a portion of the attached primary support arm, and a portion of the attached secondary support arm being rotated vertically upward relative to a manifold mounted to the link arm.
Figure 4:
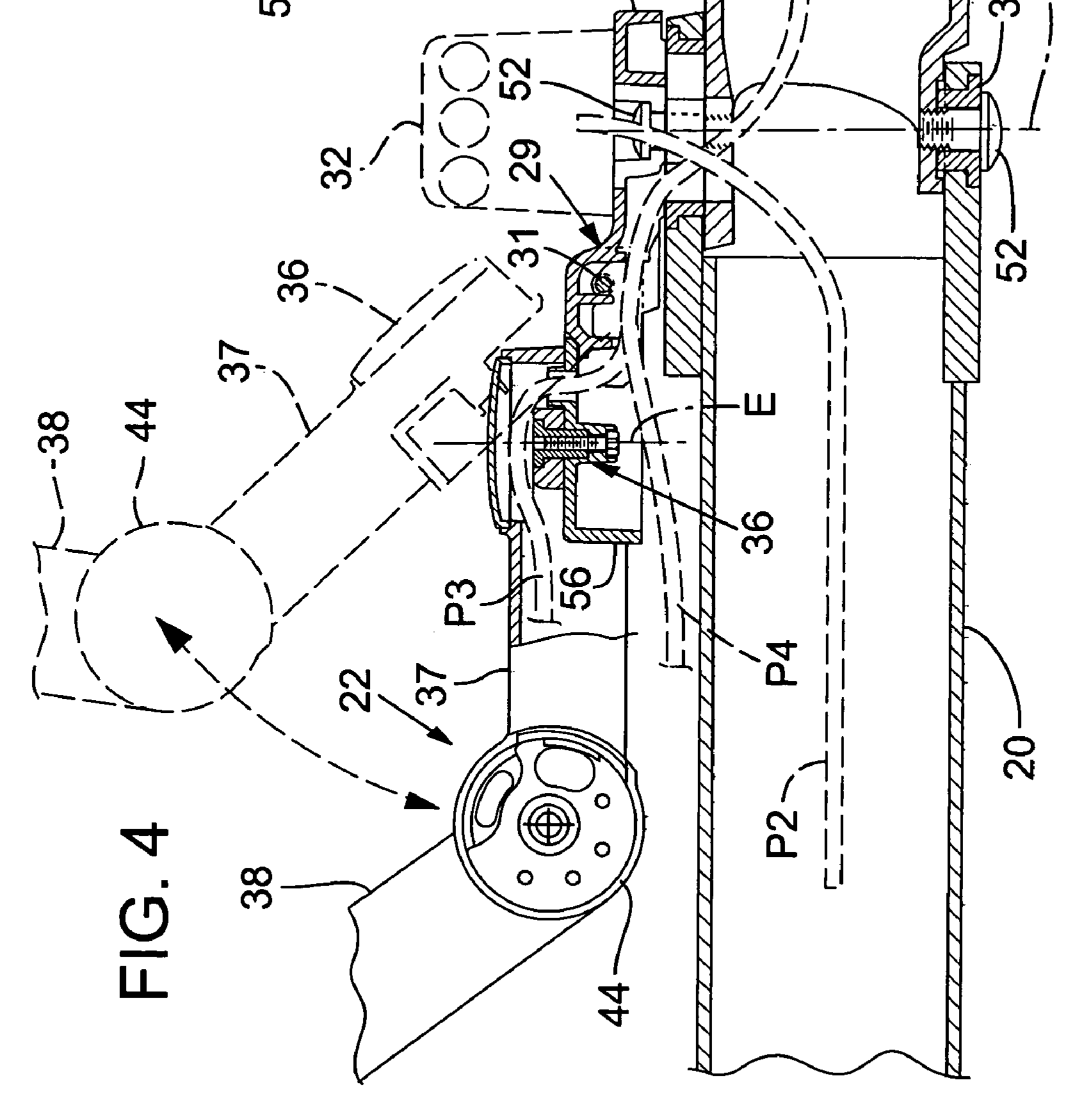
FIG. 4 is a sectioned view in elevation of a portion of the arm assembly showing the pivot connection, the link arm, a portion of the primary support arm and a portion of the secondary support arm in two positions relative to the manifold on the link arm.

At the rear, there is a main pivot bracket 16 generally aligned with the axis A to which a compensating member, e.g., a link arm 18, is pivotably connected at its proximal end such that it can be pivoted from side-to-side in a generally horizontal plane (i.e., about a generally vertical pivot axis B, as shown in FIGS. 3 and 4). One or more equipment support arms, such as, e.g., a primary arm 20 and a secondary arm 22 as shown, are attached to the link arm 18 adjacent its distal end.

In typical configurations, another arm for supporting a delivery system that houses a dentist's handpieces (e.g., a dentist's drill) may be present, but this arm has been omitted from the figures for clarity.

In the illustrated embodiment, the pivot bracket 16 is attached to the support portion 14, so that the link arm 18 and the arms 20, 22 move with the chair 11, e.g., when it is raised and lowered. In the illustrated embodiment, the pivot bracket 16 has a low-profile so that it does not unnecessarily impede access to the area beneath the chair 11, especially when the back portion 13*a* is reclined to the prone position. In other embodiments, it is possible to attach the link arm to another portion of the system 10. It is also possible to have the link arm 18 attached to a stationary portion of the system, such as the base 12 or the floor, if height adjustment ability is not required.

The primary arm 20 and the secondary arm 22 are configured for generally independent movement relative to each other. In the illustrated embodiment as shown most clearly in FIGS. 3 and 4, the primary arm 20 and the secondary arm 22 are connected to the link arm 18 along a common axis C. The axis C is the pivot axis for the primary support arm 20. Although the secondary arm 22 is coupled to the link arm 18 along the same axis C, the secondary arm 22 in FIG. 1 is configured to pivot in a horizontal plane about a different axis (i.e., an axis E as shown in FIG. 4) that is spaced farther than axis C from the axis B. In other embodiments, the secondary arm 22 can also pivot about axis C.

FIG. 3 shows the pivot bracket 16, the link arm 18 and portions of the primary arm 20 and the secondary arm 22 in greater detail. As shown in FIG. 3, the illustrated portion of the primary arm 20 is generally at the same vertical level as the link arm 18 and thus pivots in generally the same horizontal plane. The secondary arm 22 is attached at the upper surface of the link arm 18 and is cantilevered outwardly from its distal end. As best shown in FIG. 4, the secondary arm 22 is configured to rotate in a horizontal plane (about axis E) at a slightly higher level than the link arm 18 and the primary arm 20.

FIG. 3 also shows a manifold 32 coupled to the upper surface of the link arm 18 adjacent its distal end. As illustrated, the manifold 32 can be pivotably connected to the link arm 18 to allow the manifold to be rotated relative to the link arm 18, e.g., during repositioning. In the illustrated embodiment, the manifold 32 is generally aligned along the axis C and has a generally cylindrical or ellipsoidal shape. The manifold 32 serves to position conduits 34 extending from an area beneath the chair 11 and through the link arm 18 so that they drape effectively and do not interfere with movement of the arms 20, 22 and other equipment during procedures. The manifold 32 generally includes a screen (not shown) to prevent entry of foreign matter into fluid systems.

As shown in FIG. 1, the conduits 34 are connected to various tools mounted to a tool holder 33 attached at a distal end of the secondary arm 22. These tools are used to provide water, to provide compressed air, and/or to provide vacuum. As used herein, "conduits" refers to tubing, cables, lines and other similar structure through which fluids, pressure, power or signals are transferred.

As shown in FIG. 4, various conduits may be routed through internal portions of the link arm 18, the primary arm 20 and the secondary arm 22. For example, electrical, air and water lines may extend from beneath the chair and along the path P1 through the link 18, with the air and water lines being routed through the secondary arm 22 and exiting on its lower side (path P4), and the electrical line extending through the remaining portion of the secondary arm 22 (e.g., to provide power and/or communicate signals to equipment such as the tools and a control unit) (path P3). The path P2 represents a vacuum line extending from the area of the manifold 32 and through at least a portion of the primary support arm 20.

As shown in FIG. 1, there can be another conduit that extends from one of the tools 33 to the area below the chair that is not routed through or positioned by the manifold 32.

Referring to FIG. 1, the primary arm 20 and the secondary arm 22 are sized and shaped to movably support various equipment used in dental procedures. For convenience, the arm 20 is referred to as the "primary" arm because it generally has a more substantial construction than the secondary arm 22, although this is not a requirement in all implementations.

As best shown in FIGS. 1 and 2, the primary arm 20 has an upwardly extending mast 24, which can be positioned as shown at its distal free end, or at other points along its length. In the embodiment of FIG. 1, there is a light standard 28 and a monitor 30 coupled to an upper end of the mast 24. There is also a housing 23 coupled to the mast 24. The housing 23 can be rotatably coupled to the mast 24, such that equipment attached to the housing, e.g., a cuspidor 27 and/or an ancillary housing unit 26 (shown only in FIG. 2) can be rotated to any convenient orientation relative to the mast 24. For example, if the primary arm 20 is swung from the left side of the chair 11 as shown in FIG. 1 to the right side of the chair 11, as shown in FIG. 2, the housing 23 can be rotated to position the cuspidor 27 closer to the patient. The cuspidor 27 can also be independently rotatable relative to the housing 23.

An interior space within the housing 23 can be used for various purposes, including housing circuitry and valves, as well as for storage of items. The ancillary housing 26 may be used for general storage, or may be equipped as an amalgam collection unit for storage of amalgam and other similar materials requiring special handling.

In the illustrated embodiment, the primary arm 20 is restricted to rotation in a generally horizontal plane about a first pivotable connection 35 at the axis C adjacent its proximal end. Typically, the connection with the mast 24 is a rigid one. It would be possible, of course, to adapt the primary arm 20 to include other segments allowing other motion, e.g., vertical movement to position equipment at different levels.

The secondary arm 22 can have an anti-interference or clearance-providing feature that allows easy relative movement between the secondary arm 22 and the primary arm 20. In the illustrated embodiment as shown in FIG. 3, the secondary arm 22 has an auxiliary pivot connection 31 between its proximal end attached at the axis C and a first pivot connection 36. The auxiliary pivot connection 31, which defines pivot axis D, permits the distally extending portion of the arm 22 to be pivoted upwardly in the vertical plane, e.g., as shown in FIG. 4. The auxiliary pivot connection 31 permits movement of the secondary arm 22 relative to other surrounding structure, e.g., to allow movement of the primary arm 20 and the secondary arm 22 relative to each other. The auxiliary pivot connection 31 will also permit pivoting in the event that the descending secondary arm 22 contacts another object upon the lowering of the chair 11, which may assist in preventing damage. The auxiliary pivot connection 31 may have an internal stop (not shown) to limit rotation of the distally extending portion of the arm 22 to a predetermined range.

Referring to FIGS. 1–4, the secondary arm 22 has multiple segments. For the embodiment shown in FIG. 4, these segments include: (1) a short first segment 29, which includes the auxiliary pivot connection 31, connected to the link arm 18 at the axis C and having its distal end at the first pivot connection 36 (axis E); (2) a second segment 37 connected to the first segment 29 at the axis E and having its distal end at a second pivot connection 44; and (3) a third segment 38 connected to the second segment 37 and having its distal end at a third pivot connection 46. In FIG. 1, the third segment 38 is also connected to (4) an optional fourth segment 40 with a fourth pivot connection 48 as shown in FIGS. 1 and 2, to which another segment or equipment can be connected. (Of course, the link arm 18 can also be properly considered as the "base" segment for the multi-segmented secondary arm.)

Figure 12:
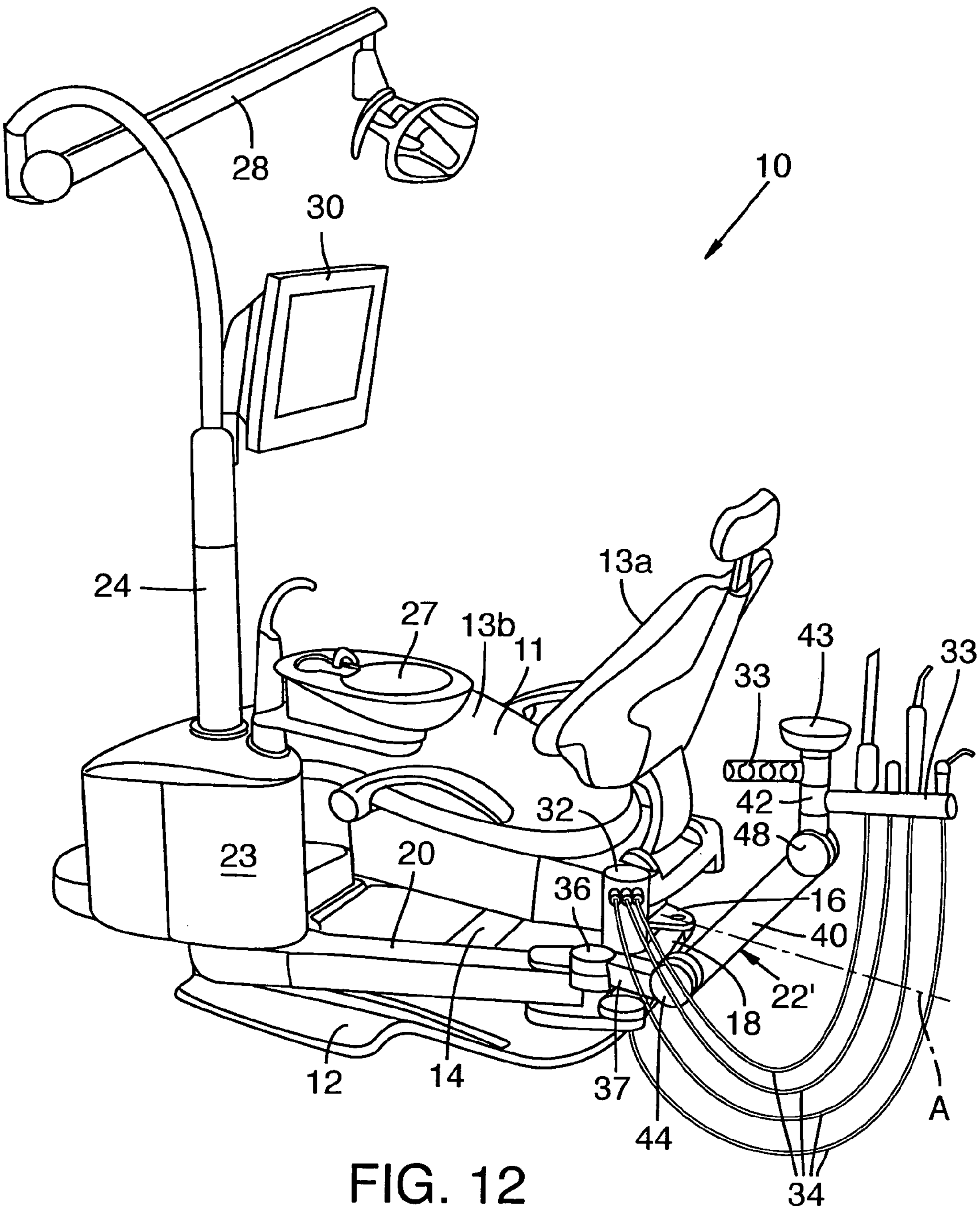
FIG. 12 is a left side perspective view of a representative dental chair system similar to FIG. 1, except showing an alternative embodiment of the secondary support arm.

FIG. 12 shows an alternative embodiment of the secondary arm 22' having three segments, i.e., the segments 29, 37 and 40, without the segment 38. In FIGS. 14A–14E, the shorter secondary arm 22' is referred to as the "short arm," and the longer arm 22 is referred to as the "long arm."

In the illustrated embodiments of the secondary arms 22, 22', a relatively short terminal segment 42 is pivotably attached to the segment 38 or the segment 40, respectively. The terminal segment 42 supports at least one tool holder 33 as shown in FIGS. 1 and 2. If desired, the modular construction allows a second tool holder 33 to be added, as shown in FIG. 12. Each tool holder 33 is preferably rotatable relative to the terminal segment 42.

Also coupled to the secondary arm 22, 22' is a chair system control unit 43, which is sometimes referred to as a "touch pad." In the illustrated implementations, the control unit is mounted above the tool holder(s) to allow easy access and viewing. The control unit 43 has a user interface with controls for allowing the practitioners to input commands, including, e.g., to reposition the chair (changing its height and/or inclination), to operate the light(s) and cuspidor, and to control various other subsystems. The control unit 43 is preferably rotatable relative to its mounting point so it can be oriented toward the user.

As can be seen from FIGS. 1, 2 and 12, the pivot connection 36 allows the secondary arm 22, 22' to be swung in a generally horizontal plane at a level above the link arm 18 and the primary arm 20. The pivot connections 44, 46 and 48 are designed to permit rotation of the respective segments in a generally vertical plane. Various combinations of vertical rotations among the segments permit the secondary arm 22, 22', and particularly any attached equipment such as the tool holder(s) 33 and the control unit 43, to be positioned as desired in space. The secondary arm 22, 22' can be raised, lowered and translated.

The connection between the first segment 29 and the link arm 18 at the axis C is typically configured as a rigid connection not allowing any rotation, but a non-rigid connection allowing at least some rotation could also be used.

Operation

In operation, the dental chair system 10 may be configured as shown in FIG. 1 (primary arm 20 on the left side), FIG. 2 (primary arm 20 on the right side) or in any other different position within the range permitted by the link arm 18 and the primary arm 20. Typically, the link arm 18 is rotated to its full extent toward either the left side or the right side of the chair 11, i.e., to extend outward approximately perpendicular to the axis A. Rotations of the link arm 18 to other positions, are, of course, possible. Referring to FIG. 14C, which is a schematic plan view, the link arm is shown rotated to the left side of the chair with the primary arm 20 and attached equipment extending along the left side of the chair and positioned between the chair and the assistant. The secondary arm ("long arm") is also positioned on the left side, but extends toward the head end of the chair.

Positioning the link arm 18 to the left or the right of the longitudinal axis A repositions the vertical pivots for the primary arm 20 and secondary arm 22 or 22', respectively, thereby compensating for the position of the pivot bracket 16 and allowing the arms to be swung closer to the sides of the chair 11. Because the arms are positioned closer to the sides of the chair 11, they pose less interference to the practitioners. Because the link arm 18 is attached to the chair 11 along the longitudinal axis A, the dental chair system is not biased toward left-handed or right-handed dentistry and can be quickly adapted between both modes, even multiple times over each day as may be required in a busy practice.

Depending upon the setting where the dental chair system 10 is in use, the primary arm 20 may be swung outward to provide the patient access to the floor to ease egress from and ingress into the chair.

The secondary arm 22 or 22' may be initially configured as shown in FIGS. 1 and 2, i.e., extending rearwardly, so as to be out of the way, e.g., during a patient's ingress into and egress from the chair. During treatment, the practioner(s) will position the secondary arm 22 or 22' as necessary to provide convenient access to the tools in the holder 33 and to avoid interference with other equipment.

Exemplary positions for the secondary arm 22, 22' relative to the position of practitioner(s) for six different styles of dentistry practice are shown schematically in FIGS. 14A–14F. The positions shown in FIGS. 14A–14F are as would be used by typical right-handed dentists. The corresponding positions for left-handed dentists are not shown, but these positions would be the mirror images of FIGS. 14A–14F relative to the longitudinal axis.

Figure 14A:
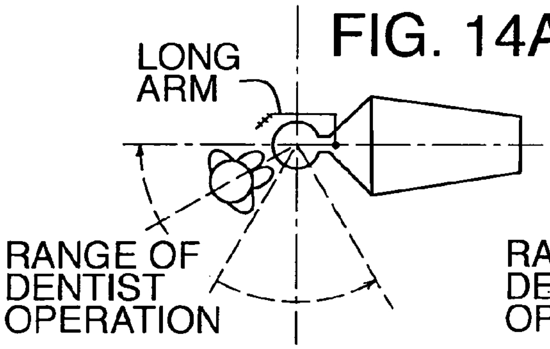
FIGS. 14A–14F are schematic diagrams depicting a reclined dental chair and the relative positions of one or two dental practitioners and the secondary arm of this application.

FIG. 14A shows the long secondary arm, i.e., the secondary arm 22 with four segments, as it may be positioned for so-called "2-handed indirect" dental practice involving only a dentist. As indicated, the dentist's typical practice area would be as shown in FIG. 14A (i.e., in the range from about 12 o'clock to about 8 o'clock). Typically the long secondary arm 22 would be positioned as shown on the opposite side of the longitudinal axis relative to the dentist.

Figure 14B:
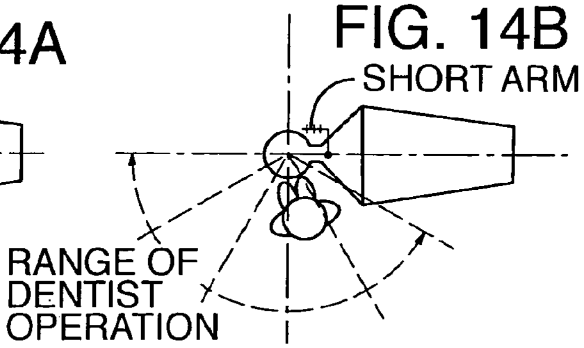
Figure 14C:
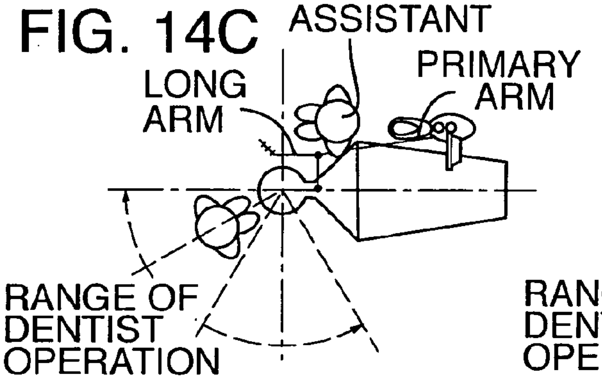

FIG. 14B shows the short secondary arm, i.e., the secondary arm 22' with three segments, as it may be positioned for 2-handed indirect dental practice involving only a dentist. As indicated, the dentist's typical practice area would be as shown (i.e., in the range from about 12 o'clock to about 7 o'clock).

FIG. 14C shows the long secondary arm, i.e., the secondary arm 22, as it may be positioned for "4-handed indirect" dental practice involving a dentist and another practitioner, referred to here as an assistant. As indicated, the dentist's typical practice area would be as shown (i.e., in the range from about 12 o'clock to about 8 o'clock). As described above, FIG. 14C also shows the relative position of the primary arm.

Figure 14D:
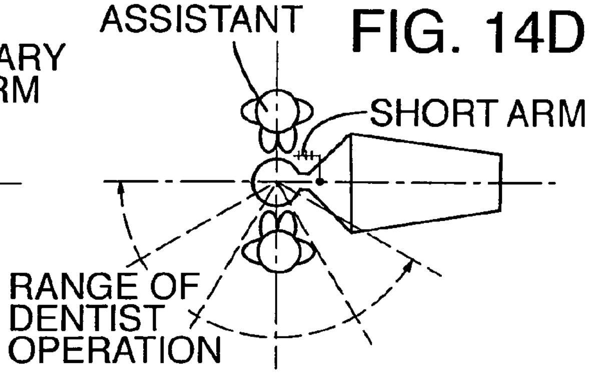

FIG. 14D shows the short secondary arm, i.e., the secondary arm 22', as it may be positioned for "4-handed indirect" dental practice. As indicated, the dentist's typical practice area would be as shown (i.e., in the range from about 12 o'clock to about 7 o'clock).

Figure 14E:
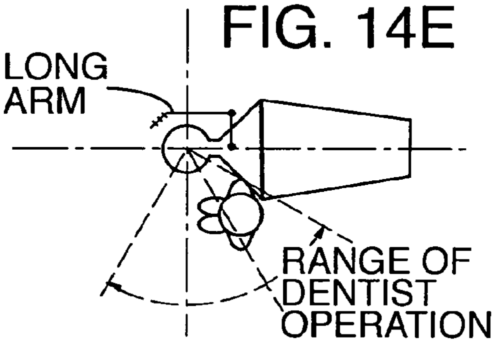
Figure 14F:
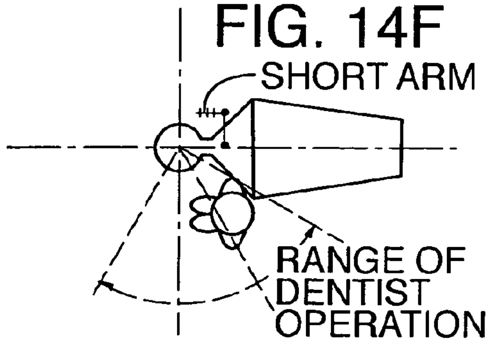

FIGS. 14E and 14F show the long secondary arm 22 and the short secondary arm 22', respectively, positioned for "2-handed direct" dental practice. As indicated, the dentist's typical practice area would be as shown (i.e., in the range from about 10 o'clock to about 7 o'clock).

Construction

In the illustrated embodiment, the primary arm 20 has a substantial lateral length between the axis C and its distal end adjacent to the mast 24, which can create a substantial moment from the weight of the arm and mast, the ancillary housing 26, the light 28 and monitor 30, etc., acting through this length. In the illustrated embodiment, the link arm 18 and primary arm 20 each have a hollow cross-section to increase the resistance to bending and/or twisting in the link arm 18 and the primary arm 20, without unnecessarily increasing weight. As best shown in FIG. 6, the cross-section may have the shape of a sideways "D" with a broader, flat upper surface and a narrower, rounded lower surface.

The hollow cross-section of the link arm 18 and the primary arm 20 allows the conduits 34 to be routed through the interior open areas as shown schematically in FIG. 4; which prevents the conduits 34 from tangling and provides for a more aesthetic appearance.

The secondary arm 22 or 22' in the illustrated embodiment is configured to have segments that can be positioned individually at desired locations easily and which remain in place until repositioned again. The segments can be fitted with parallelogram structures that provide sufficient resistance to keep the segments in place when at rest, but the resistance can be overcome by a user to move the segments as desired. One or more of the segments, or attached equipment, such as the tool holder 33, may be configured to remain substantially level as the segments are repositioned. Such a configuration is shown for the segments in the exploded view of FIG. 13.

Figure 13:
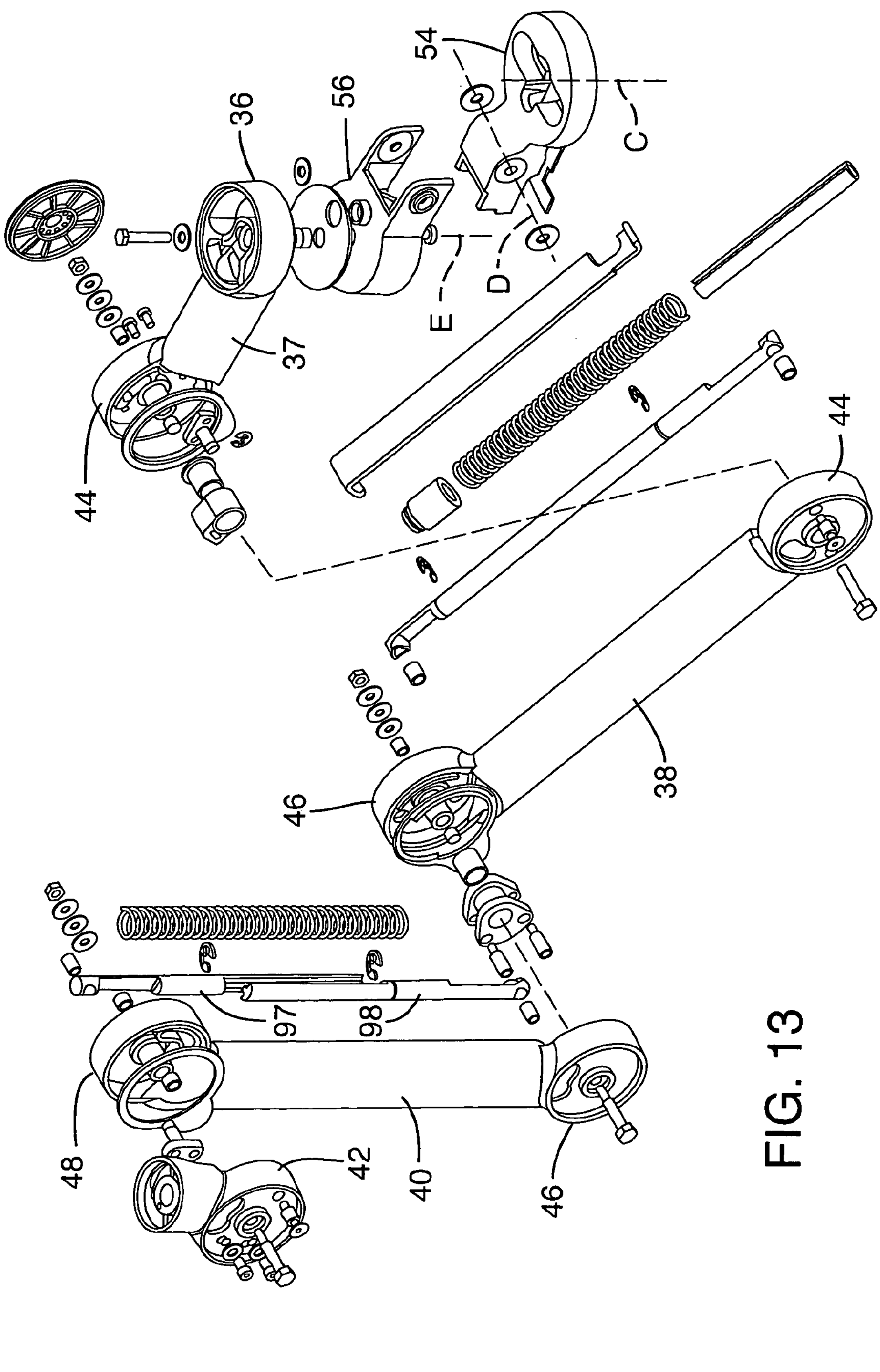
FIG. 13 is an exploded perspective view showing a construction of the secondary arm of FIG. 1.

In some implementations, it may be desirable to have one or more of the segments fitted with a construction that allows some range of over-rotation of the pivot joint without causing damage. An exemplary construction is shown in FIG. 13 for the segment 40. A pair of rod halves 97, 98 is assembled together with a spring to maintain, under normal conditions, a longitudinal gap between respective lateral surfaces of the rod halves. If the segment 40 is rotated beyond its normal range of rotation, the rod halves 97, 98 can slide relative to each other until the lateral surfaces contact, thus providing a range of over-rotation without bending the rod halves 97, 98.

Figure 5:
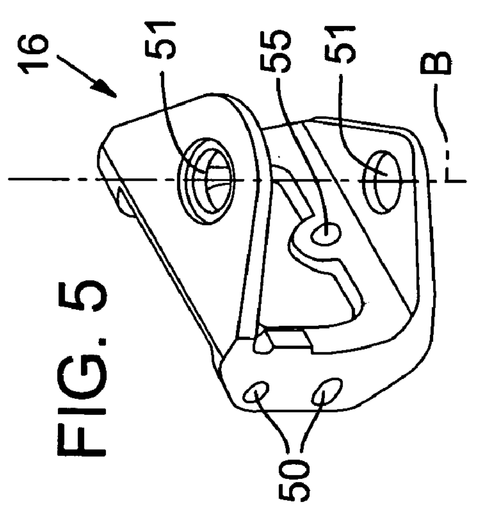
FIG. 5 is a perspective view showing the pivot bracket for attaching the arm assembly to a portion of the dental chair assembly.

FIG. 5 is a perspective view of the pivot bracket 16 of the illustrated embodiment. The pivot bracket 16 has mounting apertures 50 (two of which are shown in FIG. 5) and pivot apertures 51 for receiving a pivot member, such as pivot bolts 52 (FIG. 4) or a pivot pin. The pivot bracket 16 may be formed as a single piece as shown, or as multiple pieces. The pivot bracket 16 may also have a leveling feature 55 to assist in adjusting the inclination of the assembly.

FIG. 6 is a perspective view of the link arm 18. In the illustrated embodiment, the link arm 18 has a length of about 8 inches, which, when swung leftward or rightward of the longitudinal axis A, is sufficient in many applications for repositioning the arms 20, 22 along either side of the chair 11. Of course, other applications may require the link arm 18 to be resized to a different length.

FIGS. 7 and 8 are perspective views of a first part 54 and a second part 56, respectively, that are pivotably joined at the auxiliary pivot connection 31 of the first segment 29 (axis D). For reference, the first part 54 is shown in dashed lines in relation to the second part in FIG. 8. The second part 56 has a projection 58 on its upper surface.

FIG. 9 is a top plan view of the segment 37. In the illustrated embodiment, the segment 37 is shown to have a range of rotation F relative to the second part 56 (shown in dashed lines) of about 200° as restricted by a groove 60 that receives the projection 58 as shown.

FIGS. 10 and 11 show cross-sections of the segment 37. As illustrated, the segment 37 has a generally elliptical hollow cross-section at points spaced from its ends. The other segments 38 and 40 of the secondary arm 22, 22' may have similar cross-sections.

The pivot bracket 16, link arm 18 and the arms 20, 22, 22' can be made from any suitable materials. For example, these components may be cast and then machined and/or subjected to a suitable surface treatment, as necessary. The various pivot connections may be made with bolts, such as the pivot bolts 52, pins, bearings, washers and/or other hardware suitable for providing secure but rotatable connections.

Overall, the system is highly modular, as the configuration of the arms can be adapted to individual needs, e.g., through choice of the long secondary arm or the short secondary arm, the various items of equipment that can be supported by the primary arm, the number of tool holders, etc. Once installed, the on-axis mounting configuration and rotatable equipment mounting allow for easy conversion between use by right-handed and left-handed practitioners, as well as between different styles of practice. The secondary arms afford a wide range of motion and have multiple degrees of freedom to provide more flexibility in positioning of equipment. The construction of the arms and other equipment is robust and has an aesthetic appearance.

Although the invention has been disclosed in this patent application by reference to the details of some preferred embodiments, it is to be understood that this disclosure is intended in an illustrative rather than in a limiting sense, as it is contemplated that modifications will readily occur to those skilled in the art within the spirit of the invention and the scope of the following claims.

What is claimed is:

1. A multi-segmented arm assembly for a dental chair, comprising:

a link arm segment for pivotable attachment to a rear of the dental chair;

a first segment coupled to the link arm segment;

a second segment pivotably connected to the first segment at a substantially vertical pivot axis;

a third segment pivotably connected to the second segment at a substantially horizontal pivot axis; and a terminal segment pivotably connected to the third segment, wherein at least one of the segments is configured to have a predetermined normal range of normal rotation about its respective pivot axis and to permit over-rotation beyond the predetermined normal range without damage to the at least one segment.

2. The arm assembly of claim 1, wherein the terminal segment is pivotably connected at a substantially horizontal pivot axis.

3. The arm assembly of claim 1, further comprising a parallelogram supporting structure for at least one segment.

4. The arm assembly of claim 1, further comprising a parallelogram supporting structure for at least the third segment.

5. A multi-segmented arm assembly for a dental chair, comprising:

a link arm segment for pivotable attachment to a rear of the dental chair;

a first segment coupled to the link arm segment;

a second segment pivotably connected to the first segment at a substantially vertical pivot axis;

a third segment pivotably connected to the second segment at a substantially horizontal pivot axis;

a fourth segment pivotably connected to the third segment at a substantially horizontal pivot axis;

a terminal segment pivotably connected to the fourth segment; and wherein at least one of the segments is configured to have a predetermined normal range of normal rotation about its respective pivot axis and to permit over-rotation beyond the predetermined normal range without damage to the at least one segment.

6. The arm assembly of claim 5, wherein the terminal segment is pivotably connected at a substantially horizontal pivot axis.

7. The arm assembly of claim 5, wherein the link arm segment has a distal end and the first segment is connected to the link arm segment at the distal end of the link arm segment.

8. The arm assembly of claim 5, wherein the first segment has a distal end and the second segment is connected to the first segment at the distal end of the first segment.

9. The arm assembly of claim 5, wherein the second segment has a distal end and the third segment is connected to the second segment at the distal end of the second segment.

10. The arm assembly of claim 5, wherein the third segment has a distal end and the terminal segment is connected to the third segment at the distal end of the third segment.

* * * * *